(12) United States Patent
Hernandez-Avalos et al.

(10) Patent No.: US 9,087,377 B2
(45) Date of Patent: Jul. 21, 2015

(54) VIDEO WATERMARKING METHOD RESISTANT TO TEMPORAL DESYNCHRONIZATION ATTACKS

(75) Inventors: Pedro Aaron Hernandez-Avalos, Tonantzintla (MX); Claudia Feregrino-Uribe, Tonantzintla (MX); Rene Cumplido-Parra, Tonantzintla (MX); Jose Juan Garcia-Hernandez, Tonantzintla (MX)

(73) Assignee: INSTITUTO NACIONAL DE ASTROFISICA, OPTICA Y ELECTRONICA, Tonantzintla Puebla (MX)

( * ) Notice: Subject to any disclaimer, the term of this patent is extended or adjusted under 35 U.S.C. 154(b) by 230 days.

(21) Appl. No.: 13/806,452

(22) PCT Filed: Jul. 19, 2011

(86) PCT No.: PCT/IB2011/001665
§ 371 (c)(1),
(2), (4) Date: Dec. 21, 2012

(87) PCT Pub. No.: WO2012/010947
PCT Pub. Date: Jan. 26, 2012

(65) Prior Publication Data
US 2013/0094692 A1 Apr. 18, 2013

Related U.S. Application Data (60) Provisional application No. 61/399,945, filed on Jul. 19, 2010.

(51) Int. Cl.
*G06T 1/00* (2006.01)
*H04N 19/467* (2014.01)
*H04N 21/8358* (2011.01)

(52) U.S. Cl.
CPC ............. *G06T 1/0021* (2013.01); *G06T 1/0057* (2013.01); *G06T 1/0085* (2013.01); *H04N 19/467* (2013.01); *H04N 21/8358* (2013.01)

(58) Field of Classification Search
CPC ..... G06T 1/0021; G06T 1/005; G06T 1/0057; G06T 1/0071; G06T 1/0085; G06T 2201/0063; G06T 2201/0601; H04N 1/32144; H04N 1/32267; H04N 1/32277; H04N 1/32288; H04N 1/32293; H04N 1/3232; H04N 7/26372; H04N 21/8358
USPC .......... 382/100, 232, 235; 348/461, 464, 465, 348/467; 380/205, 217, 287; 713/176
See application file for complete search history.

(56) References Cited

U.S. PATENT DOCUMENTS

| | | | |
|---|---|---|---|
| 2002/0172394 A1* | 11/2002 | Venkatesan et al. | 382/100 |
| 2003/0202660 A1* | 10/2003 | Zhou et al. | 380/210 |
| 2006/0045308 A1* | 3/2006 | Abrams et al. | 382/100 |
| 2010/0037059 A1* | 2/2010 | Sun et al. | 713/176 |
| 2010/0128921 A1* | 5/2010 | Alattar et al. | 382/100 |

OTHER PUBLICATIONS

Hernandez-Avalos et al., "Video Watermarking Scheme resistant to MPEG Compression", Proc. IEEE Int'l Midwest Symp. on Circuits and Systems, Aug. 2009, pp. 853-858.*

* cited by examiner

*Primary Examiner* — Andrew W Johns
(74) *Attorney, Agent, or Firm* — Browdy and Neimark, PLLC (57) ABSTRACT

A video watermarking method resistant to temporal desynchronization attacks, of the type that comprises a watermark embedding, an attack stage and a watermark detection stage wherein during the watermarking embedding stage, the same watermark is hidden in a number of frames given by the mutual information between them; a temporal redundancy control is modified to hide a watermark in each possible I-frame; and during the watermark detection stage, the watermark extractor takes all the frames watermarked with the same key to extract its characteristics.

15 Claims, 4 Drawing Sheets

| Test | BCR (%) Proposed | BCR (%) Lin | Test | BCR (%) Proposed | BCR (%) Lin Scheme |
|---|---|---|---|---|---|
| Insertion 5% | 100 | 100 | Simple averaging 5% | 100 | 100 |
| Insertion 10% | 100 | 100 | Simple averaging 10% | 100 | 100 |
| Insertion 15% | 100 | 100 | Simple averaging 15% | 98.09 | 95.64 |
| Insertion 20% | 100 | 100 | Simple averaging 20% | 92.38 | 90.1 |
| Insertion 25% | 100 | 100 | Simple averaging 25% | 87.61 | 85.72 |
| Insertion 30% | 100 | 100 | Simple averaging 30% | 83.80 | 79.64 |
| Insertion 35% | 100 | 100 | Simple averaging 35% | 76.19 | 70.19 |
| Insertion 40% | 100 | 100 | Simple averaging 40% | 68.57 | 56.87 |
| Insertion 45% | 100 | 100 | Simple averaging 45% | 62.82 | 46.39 |
| Insertion 50% | 100 | 100 | Simple averaging 50% | 65.71 | 44.05 |
| Frame dropping 5% | 100 | 100 | Sliding averaging 2 | 38.09 | 40.72 |
| Frame dropping 10% | 98.08 | 97.21 | Sliding averaging 3 | 23.80 | 34.12 |
| Frame dropping 15% | 96.10 | 95.81 | Sliding averaging 4 | 12.38 | 19.81 |
| Frame dropping 20% | 94.28 | 93.6 | Decimation 3 | 100 | 100 |
| Frame dropping 25% | 91.42 | 84.37 | Decimation 4 | 100 | 100 |
| Frame dropping 30% | 82.85 | 79.45 | Decimation 5 | 100 | 98.08 |
| Frame dropping 35% | 80.95 | 75.23 | Decimation 6 | 100 | 98.08 |
| Frame dropping 40% | 75.23 | 71.56 | Duplication and dropping 15 | 72.38 | 68.52 |
| Frame dropping 45% | 71.42 | 64.4 | Duplication and dropping 24 | 100 | 100 |
| Frame dropping 50% | 62.85 | 62.13 | Duplication and dropping 25 | - | - |
| Simple transposition 5% | 100 | 100 | Duplication and dropping 30 | 100 | 100 |
| Simple transposition 10% | 99.01 | 99.04 | Frame blending 15 | 35.23 | 31.71 |
| Simple transposition 15% | 95.23 | 95.23 | Frame blending 24 | 100 | 100 |
| Simple transposition 20% | 94.28 | 93.84 | Frame blending 25 | - | - |
| Simple transposition 25% | 9047 | 89.01 | Frame blending 30 | 100 | 100 |
| Simple transposition 30% | 91.42 | 88.57 | Simultaneous transposition 5% | 99.04 | 100 |
| Simple transposition 35% | 88.57 | 87.32 | Simultaneous transposition 10% | 98.09 | 97.96 |
| Simple transposition 40% | 88.57 | 86.6 | Simultaneous transposition 15% | 94.28 | 94.58 |
| Simple transposition 45% | 86.60 | 85.2 | Simultaneous transposition 20% | 96.19 | 92.1 |
| Simple transposition 50% | 85.71 | 83.74 | Simultaneous transposition 25% | 93.33 | 90.2 |
| MPEG - 2 100 bps | 56.19 | 38 | Simultaneous transposition 30% | 90.47 | 86.30 |
| MPEG - 2 200bps | 86.60 | 56.7 | Simultaneous transposition 35% | 88.57 | 82 |
| MPEG - 2 300 bps | 98.10 | 86.7 | Simultaneous transposition 40% | 84.76 | 80.7 |
| MPEG - 2 400 bps | 100 | 100 | Simultaneous transposition 45% | 85.71 | 78.03 |
| MPEG- 4 part 2 100kps | 46.66 | 34.7 | Simultaneous transposition 50% | 80 | 75.17 |
| MPEG -4 part 2 200kp | 78.09 | 42 | MPEG - 4 part 10 100kps | 36.19 | 26.7 |
| MPEG -4 part 2 300kp | 96.10 | 73.3 | MPEG - 4 part 10 200kp | 80 | 40 |
| MPEG -4 part 2 400kp | 100 | 100 | MPEG - 4 part 10 300kp | 93.33 | 66.7 |
| Combined attack | 5.71 | 3.45 | MPEG - 4 part 10 400kp | 100 | 100 |

FIG. 7

VIDEO WATERMARKING METHOD RESISTANT TO TEMPORAL DESYNCHRONIZATION ATTACKS

TECHNICAL FIELD

The present invention relates to multimedia signal processing, temporal synchronization protocols for video and audio, and temporal synchronization in digital watermarking applications and more particularly, it is related to a video watermarking method resistant to temporal desynchronization attacks.

BACKGROUND OF THE INVENTION

The use of video watermarking is focused on protection issues where just a few bits are enough for copyright protection of content. Nevertheless, the use of methods that embed more information opens the door for the use of the watermarking in emerging rich media applications like indexing, subtitles, hypervideo, interactive video, etc. as disclosed by Dumitru et al. at the EUROCON 2007 conference: "Gaussian Hypothesis for Video Watermarking Attacks: Drawbacks and Limitations".

Nowadays, the protection of videos is usually achieved by hiding a single watermark in a full video such as the method disclosed in the PhD thesis of L. Coria-Mendoza "Low-Complexity methods for Image and Video Watermarking". The watermarking methods for media protection embed little information to ensure a greater probability of detection. Increasing the capacity of information embedding involves the use of more complex watermarking methods, mainly to ensure the correct extraction of the watermark in the right order. This implies introducing a temporal synchronization phase, e.g., temporal synchronization is the process of identifying the correspondence between the temporal coordinates of the watermarked signal and the ones for watermark. Furthermore, it is important to mention that the video will be compressed, which causes the watermarking methods to be robust to video compression attacks.

As it is known, the video compression process removes temporal redundancy by using a motion compensation unit and a rate control unit. These two internal tasks are the main cause of temporal desynchronization on compressed videos. The temporal synchronization is crucial for successfully detecting watermarks. If the detector cannot be synchronized with its input video, an embedded watermark cannot be detected even though it is present in the video. The video compression methods attack the watermark hidden in each frame and desynchronize in time the detector due to the mechanism used to reduce the redundancy in the video. Thus, if two or more frames hide a single watermark (regardless of the reasons), then a temporal synchronization process is necessary to resist the video compression attack.

In order to achieve temporal synchronization and resistance to video compression, some watermarking methods, such as the one described by Zhang et al. at the ISDA 2007 conference: "A Video Watermarking Method Resistant To Synchronization Attacks Based On Statistics And Shot Segmentation", and Kezheng et al. at the ISKE 2008 conference: "Video Watermarking Temporal Synchronization On Motion Vector", hide information by changing slightly the magnitudes of the motion vectors of an entire scene. To perform this, motion vectors are classified into different groups, then a bit of information is embedded in each one. In this way, a bit is hidden within a group of vectors with similar characteristics. However, when using the internal task of MPEG compression as disclosed by Moving Pictures Expert Group ISO/IEC 14496-2, ISO/IEC 14496-10 and ISO 13818, (the generation of motion vectors), these methods provide robustness to this attack. This could be seen as a disadvantage because if the video is re-encoded, the watermark can be lost.

C. Chen et al. at the 2008 Congress on Image and Signal Processing, in the document "A Compressed Video Watermarking Method With Temporal Synchronization", provides another method which hides information using other inner process carried out into the compression process like the use of the DCT coefficients (Discrete Cosine Transform), in the MPEG-4 compression. The spread spectrum is used to hide the same watermark in a subset of DCT blocks per video scene. This method depends on the internal task performed by the encoder.

The method described by Lin et al. in the documents: "Temporal synchronization in video watermarking" published in the Proceedings of the SPJE International Conference on Security and Watermarking of Multimedia Contents IV: "Temporal synchronization in video watermarking" published in IEEE Transactions on signal processing; and by Delp et al. in the document "Optical and Digital Techniques for Information Security" of 2005, hides information on the raw video, which makes it independent of the encoder. However, the method was not resistant to compression attacks.

The method above mentioned performs temporal synchronization by manipulating the embedding keys used for watermarking each frame. In this way, the watermark that is embedded in each frame carries along temporal information. The key is changed every $\beta$ frames using the information of the current frame and the previous key, thereby a new key time dependent of the current and the previous frame is generated.

In U.S. Pat. No. 7,567,721 B2 a method for embedding digital watermarks in compressed video include perceptual adapting a digital watermark in predicted and non-predicted data based on block activity derived from the compressed video stream, embedding in predicted objects in a video stream having separately compressed video objects and bit rate control of watermarked video.

One of the improvements made to the original Lin's method algorithm is attributed to a paper published by Delp and Lin in 2004, "Temporal Synchronization In Video Watermarking", the disclosure of which was incorporated in the U.S. Pat. No. 7,886,151 which describes a protocol for temporal synchronization of media signals with temporal components to be used in digital watermarking and other applications. This synchronization protocol achieves initial synchronization by finding an initial synchronization key through analysis of a temporal media signal stream. It then uses features of the stream and a queue of one or more keys from previous frames to derive subsequent keys to maintain synchronization. If synchronization is lost due to channel errors or attacks, for example, the protocol uses the initial synchronization key to re-establish synchronization. In digital watermarking applications, the synchronization protocol is agnostic to the watermark embedding and reading functions.

The U.S. Pat. No. 7,840,005 B2 relates to synchronization paradigm and applies this paradigm to different forms of synchronization, including both temporal and spatial synchronization of digital watermarks. For spatial synchronization, a paradigm in a spatial coordinate system of a media signal is applied, such as the two-dimensional spatial coordinate system of a digital still image or frame of video. The paradigm is applied to perform spatial synchronization of digital watermarks.

For performing the synchronization, the method of U.S. Pat. No. 7,840,005 B2 comprises: detecting peaks due to redundancy of features in a host media signal; wherein the redundancy is controlled via a state machine that repeats a portion of a watermark structure and varies another portion of the watermark structure over a coordinate system of the host media signal; analyzing the peaks to derive estimates of geometric or temporal distortion of the host media signal; computing a histogram of the estimated geometric or temporal distortion parameters; and from the histogram, computing a geometric or temporal distortion of the host media signal.

As we can see from the above, prior methods describe synchronizing a digital watermark by using feature extraction and a key generator. The temporal synchronization embeds a watermark within each frame that carries temporal information. The key is changed every (3 frames, which is called the local repeat. Keys are based on previous keys and information from the current frame. A finite state machine is used to calculate the keys. It is initiated by a global master key and can be reset every $\alpha$ frames (global repeat rate).

Since the present invention method is directed to a method comprising MPEG standards, it is quite convenient to define the type of frames included in it. MPEG standards include three kinds of frames: a) intra picture frames (I-frames); b) forward-predicted frames (P-frames); and c) bidirectional-predicted frames (B-frames). A video stream or recording will always start with an I-frame and will typically contain regular I-frames throughout the stream. These regular I-frames are crucial for the random access of recorded MPEG-4 files, such as with rewind and seek operations during playback. As is mentioned by Smart et al. in IC-COD-REP012 of 2008 "Understanding Mpeg-4 Video", the main disadvantage of I-frames is that they tend to compress much less than P-frames or B-frames.

I-frames are coded without reference to other frames. They are coded like an image. P-frame applies motion prediction by referencing an I-frame or P-frame in front of it, motion vector points to the block in the referenced frame. B-frame applies motion prediction, referencing a frame in front of it and/or a frame behind it. Each of the two referenced frames may be I-frame or P-frame.

Macro block (MB) in video stream is represented as a 16×16 sample area. Each MB contains six 8×8 blocks, four for luminance and two for chrominance. A block of an I-frame contains six 8×8 block S, four for luminance and two for chrominance. A block of an I-frame contains simply values of luminance or chrominance of its own. A block of a P-frame or B-frame contains the difference between the values of itself and the referenced block. This process is called motion compensation. Each frame is divided into MBs. The coding process of each block includes DCT (Discrete Cosine Transform), quantization, run length encoding and entropy coding in that order. The resulting video stream comprises of entropy codes, motion vectors and control information about the structure of video and characteristics of coding.

The present invention method provides a more robust video watermarking method resistant to various types of attacks. The present invention comprises a method which is robust to MPEG-2, MPEG-4 Part 2 and MPEG-4 part 10 compression attacks. Moreover, the method provides an improved resistance against the more common temporal synchronization attacks.

BRIEF DESCRIPTION OF THE INVENTION

The present invention is directed to provide a video watermarking method resistant to temporal desynchronization attacks where at least three improvements over the prior art methods. The new method comprises: a) To perform an adaptable ($\beta$ repetition; b) To modify the characteristic extractor in order to consider ($\beta$ frames; and c) To modify the temporal redundancy in order to generate redundancy in I-frames.

One of the improvements of the present invention over the prior art is to hide the same watermark in a number of frames given by the mutual information between them. So, if in similar frames, the mutual information is high and in dissimilar frames, the mutual information is low, then a measure of similarity in time can be utilized. The metric of mutual information is given by equation I:

$$I(X, Y) = \sum_{x \in X} \sum_{y \in Y} p(x, y) \log\left(\frac{p(x, y)}{p(x)p(y)}\right) \quad \text{I)}$$

where p(x, y) is the joint probability mass function or pmf of the random variables X and Y (i.e., frame X and frame Y), p(x) and p(y) represents the marginal pmf of X and Y, respectively. In other words, mutual information measures the information that frames X and Y share.

To determine the amount of frames watermarked with the same key, a threshold U is used, in this case U=1. Furthermore, a limit in the number of consecutive frames to be watermarked is established to 20. The dissimilarity between the consecutive frames determines the end of each $\beta$ frames.

Another improvement made by the present invention is directed to the characteristics of the extractor, where it takes all the frames watermarked with the same key to extract their characteristics. An image that represents all the frames with $\beta$ repetition is obtained by averaging the low frequencies of the watermarked frames using a Gaussian filter with a $\sigma=4$.

By adding the magnitudes of the feature points to the X, Y and Z characteristics another improvement is made wherein the new X, Y and Z characteristic are no longer close and prevent the erroneous transition in the FSM. In this context, the proposed extractor is not dependent of a previous frame so the present invention averaged the characteristics from all the frames watermarked with the same key allowing a greater robustness against frame dropping.

Another improvement of the invention comprises modifications to the temporal redundancy control to hide a watermark in each possible I-frame. The present invention provides MPEG compression which encodes some frames internally as if they were images (I-frame), some others using motion estimation taking I-frames as basis (P-frame) and finally some others using motion estimation taking P-frames as basis (B-frame).

In this manner, it is pretend to hide the watermark on each possible frame to avoid the aggressive attack of motion estimation. Also, I-frames are generally created by the codificator when a shift of scene is detected. In this sense, the aim is to generate redundancy of keys utilizing the shift of scene (the end of each scene is obtained using the metric of mutual information from equation 1). In this manner, there is redundancy of scene The idea behind this new redundancy is to guarantee detection of at least one bit for each I-frame. Thus, the method of the present invention is able to support MPEG-2, MPEG-4 part 2 and MPEG-4 part 10 compressions.

This new redundancy $\gamma$ generates a new chain of watermarked frames, i.e. only the frames in the beginning of a scene are watermarked using the key generated in the previous scene change (or by using the master key $K_e$). This improvement causes that the watermark will be embedded after the scene changes. When the whole watermark was embedded, in the new beginning of a scene the watermark will be embedded again.

This second period redundancy γ is introduced that occurs with every scene change in the video. With each scene change, the key for the first frame in the scene is generated from the initial frames in the previous scene. The period redundancy α (unknown at the beginning of the embedding process) depends on the amount of information to be embedded and on the size of β (adaptable).

Another embodiment of the present invention is directed to a method which uses two α values, one for embedding the information in a sequential way and the other for embedding the information at the beginning of each scene.

The present invention also is related to modules in the key generation process comprising: a) temporal redundancy control; b) feature extraction; c) a scene detector and d) β repetition detector. This peculiarity of the invention provides the object of making the watermarking method more robust against temporal attacks and video compression. Resistance against frame dropping, frame transposition, frame decimation and frame average are significantly improved with the modified algorithm.

As we can see from the above, the present method comprises an algorithm which makes the schematic method resistant to video compression (MPEG-2, MPEG-4 part 2, MPEG-4 part 10), change of frame rate and two other ways of implementing frame average and frame transposition. These types of attacks occur inadvertently or deliberately during digital transmission, and making the watermark more robust against these attacks would allow the digital media to be more robust through more transfers.

OBJECTS OF THE INVENTION

Having in mind the drawbacks of the prior art, it is an object of the present invention to provide a video watermarking method resistant to temporal desynchronization attacks, which can resist MPEG-2, MPEG-4 Part 2 and MPEG-4 part 10 compression attacks One other object of the present invention is to provide a video watermarking method resistant to temporal desynchronization attacks, which is more robust against various types of attacks, allowing the owners of digital media to track their copyrighted property more accurately Another object of the present invention is to provide a video watermarking method resistant to temporal desynchronization attacks, which allows the keys to be less dependent on a single frame, making them more dependent on the averaged features of similar frames instead of the features of a single frame.

It is still another object of the present invention to provide a video watermarking method resistant to temporal desynchronization attacks, which provides a second global period, creating redundancy of keys for each scene shift and making the algorithm more robust against MPEG compression.

BRIEF DESCRIPTION OF THE DRAWINGS

The novel features that are considered characteristic of the present invention are set forth with particularity in the appended claims. The invention itself, however, together with other objects and advantages thereof, will be best understood in the following detailed description of certain embodiments, when read in connection with the accompanying drawings, wherein:

FIG. 7 is a table comparing BCR performance of the present invention method against Lin et al. method.

DESCRIPTION OF PREFERRED EMBODIMENTS

The present invention is directed to provide a video watermarking method resistant to temporal desynchronization attacks, increasing robustness in the method to temporal desynchronization attacks; however, for a proper understanding of the video watermarking method of the present invention, it is important making reference to the method proposed by Lin et al., which is discussed in the background of the invention chapter.

As it was mentioned above, the Lin et al. method, performs temporal synchronization by manipulating the embedding keys used for watermarking each frame. So the watermark embedded in each frame carries along temporal information. The key is changed every β frames using the information of the current frame and the previous key, thereby a new key time-dependent of the current and the previous frame is generated.

Figure 1:
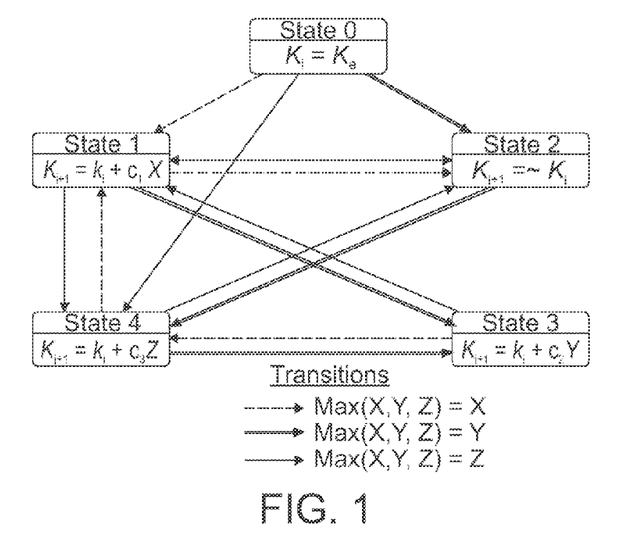
FIG. 1 is a schematic diagram of the prior art finite state machine used to generate new keys at Lin et al. method.

Regarding FIG. 1, key generation in Lin's method is achieved by a finite state machine (also known as FSM) following the next steps:

1. The finite state machine is restarted (state 0) and the current embedding key $K_i$ is set to $K_e$, which is the master key, then the embedding process generates a watermarked frame Y(i).
2. The characteristics X, Y and Z are obtained from Y(i) and they are used to define the next state in the FSM.
3. The next embedding key (used to watermark the frame X(i+1)) is computed using the state equations shown in FIG. 1.
4. The next frame is obtained and the embedding key $K_{+1}$ is used to watermark it.

The steps 2, 3, 4 are carried out, using this new frame, until all frames are generated and watermarked.

There is a mechanism for generating a period redundancy α that indicates the maximum number of frames that will be watermarked until the use of $K_e$, and a repeat redundancy β that indicates the amount of frames watermarked using the same key. In other words, a master key is seeded every α frames. The next key is then calculated from the previous key and feature information from the current frame.

Figure 2:
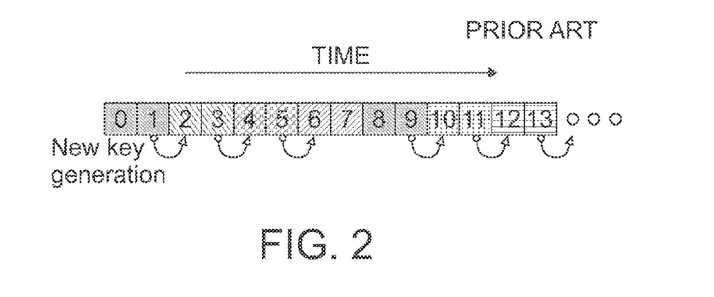
FIG. 2 is a schematic diagram of an example of the key sequence of Lin et al. method shown in FIG. 1 where a repeating key seed is applied to the FSM every eight frames (α=8) while every two consecutive frames (β=2) the local key is repeated.

In FIG. 2 it is shown an example of a key sequence with α=8 and β=2. The same tone of gray indicates that the same key was used to hide the watermark. It can be noticed that every two frames the key is changed and every eight frames the key is restarted. Moreover, the keys used in the frames 2 and 3 are not the same as those used in the frames 10 and 11. During a period α, the only key that remains unchanged is the master key $K_e$. The frames watermarked with the master key are called resynchronization frames, which are used as a reference when the detector loses synchronization. The period given by α controls the degree of overall redundancy and determines how many frames the key generator has restarted.

The repetition β controls the degree of local synchronization. A high degree of repetition β increases the redundancy and decrements the generation of new keys, which is an advantage to resist temporal attacks such as frame dropping, frame transposing and frame averaging. Moreover, if the degree of repetition is small, there is little or no redundancy, which means that when a single watermark is not detected the synchronization period is completely lost.

In the watermark detection process, the main task is carried out by the finite state machine and by a queue that keeps track of frames not synchronized. A null queue is generated first, and then the key $K_e$ is used for continuously extracting the watermark from the frames.

Once this watermark is correctly detected, the predicted state-keys (using the same FSM as in the embedding as in FIG. 1) is pushed into the queue. Then, watermark extraction of each frame is repeated with the keys $K_e$, and those reserved in the queue. When a watermark is detected, the current state-key will be moved to the front of queue if it does not belong to the initial set. Then the predicted state-keys of current state-key is pushed into the queue. The key generation in the embedding and in the extracting processes depends on the use of the FSM. When the magnitudes of X, Y and Z (from a frame) are close during the embedding process and Y(i) is attacked, the FSM transition (in the extracting process) can be different from the expected one, causing the temporal desynchronization.

Now regarding the present invention, at least three improvements over the prior art methods and more precisely, over the Lin et al. method were made. The new method comprises: a) To perform an adaptable β repetition; b) To modify the characteristic extractor in order to consider β frames; and c) To modify the temporal redundancy in order to generate redundancy in I-frames.

In the prior art methods, a fixed β repetition is used. However, this can be counterproductive due to MPEG-2, MPEG-4 part 2 and MPEG-4 part 10 compressions strongly attack temporal redundancy through motion compensation. If a frame sequence belongs to a scene with little movement, this compensation destroys part of these frames. If frame destruction happens and the magnitude of β is small, the watermark hidden in that repetition will be lost, which causes temporal desynchronization (the following keys will be lost because they are related to the previous keys).

One of the improvements of the present invention over the prior art is to hide the same watermark in a number of frames given by the mutual information between them. So, if in similar frames, the mutual information is high and in dissimilar frames, the mutual information is low, then a measure of similarity in time can be utilized. The metric of mutual information is given by equation I:

$$I(X, Y) = \sum_{x \in X} \sum_{y \in Y} p(x, y) \log\left(\frac{p(x, y)}{p(x)p(y)}\right) \quad \text{I)}$$

where p(x, y) is the joint probability mass function or pmf of the random variables X and Y (i. e., frame X and frame Y), p(x) and p(y) represents the marginal pmf of X and Y, respectively, i.e. mutual information measures the information that frames X and Y share. This information is used like a similarity measure.

Figure 3:
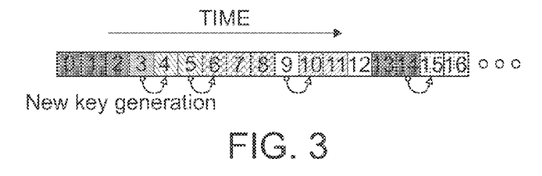
FIG. 3 is a schematic diagram of an example of the keys generated using a repetition β adaptive of the present invention method.

To determine the amount of frames watermarked with the same key a threshold U is used which range of values is at least 1. With values greater than 1, the number of consecutives frames to be watermarked increases considerable. In a preferred embodiment U=1 but in order to limit the number of consecutive frames watermarked with the same key, a "virtual" limit is established up to 20 frames. An example of this embodiment is shown in FIG. 3 where the values of β are 4, 2, 4, 3, 2 and 2. These values indicate that the first four frames are similar, the next two frames are similar too, the next four frames are similar again and so on. The dissimilarity between the consecutive frames determines the end of each β frames.

Another improvement made by the present invention is directed to the characteristics of the extractor. The extractor in the prior art obtains the characteristics from the watermarked frame (the average of frame set is being used so far) and uses them to decide the route through FSM transitions. It is important to notice that the extractor invokes the last watermarked frame of each β repetition, which generates a dependence between the frame and the generated key. In this manner, if the last frame of repetition is eliminated during detection, the characteristics of another frame will be taken into account to generate the new key; which causes that the new key is not the expected one.

The present invention comprises taking all the frames watermarked with the same key to extract their characteristics. An image that represents all the frames with β repetition is obtained by averaging the low frequencies of the watermarked frames using a Gaussian filter with a "σ" □ from 2 to 7 and more preferably a "σ"=4. It should be understood that other averaging methods could also be applied.

Figure 4:
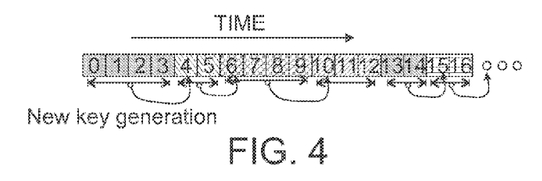
FIG. 4 is a schematic diagram of an example of the keys generated using a characteristics extractor that use a set of β frame of the present invention method.

By adding the magnitudes of the feature points (using the Harris Detector as described in the Fourth Alvey Vision Conference by Harris et al. "A Combined Corner And Edge Detection"), to the X, Y and Z characteristics another improvement is made wherein the new X, y and Z characteristic are no longer close and prevents the erroneous transition in the FSM as it is shown in FIG. 4. In this context, the proposed extractor is not dependent of a previous frame so the present invention averaged the characteristics from all the frames watermarked with the same key allowing a greater robustness against frame dropping.

Figure 5:
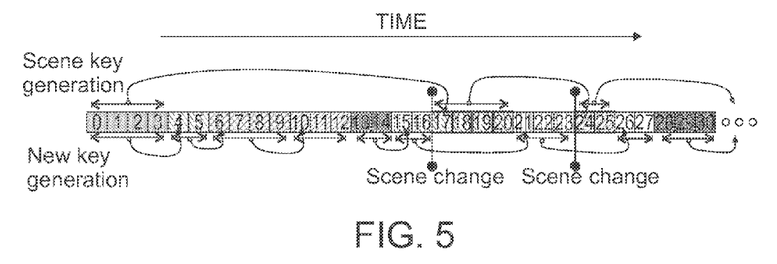
FIG. 5 is a schematic diagram of the key generation redundancy per scene using the present invention method.

In relation to FIG. 5, another improvement of the invention over the prior art is shown, which comprises modifications to the temporal redundancy control to hide a watermark in each possible I-frame. The present invention provides MPEG compression which encodes some frames internally as if they were images (I-frame), some others using motion estimation taking I-frames as basis (P-frame) and finally some others using motion estimation taking P-frames as basis (B-frame). In this manner, it is pretend to hide the watermark on each possible frame to avoid the aggressive attack of motion estimation. Also, I-frames are generally created by the codificator when a shift of scene is detected. In this sense, the aim is to generate redundancy of keys utilizing the shift of scene (the end of each scene is obtained using the metric of mutual information from equation 1). In this manner, there is redundancy of scene γ. The idea behind this new redundancy is to guarantee detection of at least one bit for each I-frame. Thus, the method of the present invention is able to support MPEG-2, MPEG-4 part 2 and MPEG-4 part 10 compressions.

This new redundancy γ generates a new chain of watermarked frames, i. e. only the frames in the beginning of a scene are watermarked using the key generated in the previous scene change (or by using the master key $K_e$). This improvement causes that the watermark will be embedded after the scene changes. When the whole watermark was embedded, in the new beginning of a scene the watermark will be embedded again. This is a new period redundancy.

This second period redundancy γ is introduced that occurs with every scene change in the video. With each scene change, the key for the first frame in the scene is generated from the initial frames in the previous scene. This minimizes the degradation from motion estimation by avoiding the use of B-frame and P-frames, which are the ones affected by motion estimation.

The period redundancy α (unknown at the beginning of the embedding process) depends on the amount of information to be embedded and on the size of β (adaptable). For example, if five bits are embedded and the values of β are: 3, 4, 3, 5 and 4, then α=19.

Another embodiment of the present invention is directed to a method which uses two α values, one for embedding the information in a sequential way and the other for embedding the information at the beginning of each scene. The key generation on method of the present invention such as embedding and extracting processes, is well known to one of ordinary skilled in the art.

The present invention also is related to modules in the key generation process comprising: a) temporal redundancy control; b) feature extraction; c) a scene detector and d) β repetition detector. This peculiarity of the invention provides the object of making the watermarking method more robust against temporal attacks and video compression. Resistance against frame dropping, frame transposition, frame decimation and frame average are significantly improved with the modified algorithm.

As we can see from the above, the present method comprises an algorithm which makes the schematic method resistant to video compression (MPEG-2, MPEG-4 part 2, MPEG-4 part 10), change of frame rate and two other ways of implementing frame average and frame transposition. These types of attacks occur inadvertently or deliberately during digital transmission, and making the watermark more robust against these attacks would allow the digital media to be more robust through more transfers.

The prior art used a feature extractor and key generator to embed a time-dependent key into each frame. A finite state machine is employed to generate each key based on the previous key and frame features. Redundancy is provided across β consecutive frames (at a previously determined value) and also the FSM is re-seeded every α frames.

Experimental Results

In order to evaluate the resistance against compression attacks, the performance of the method of the present invention is compared to the prior art, for such purpose, seven videos of 352×288 pixels with a range of 870 to 2101 frames at 25 frames per second (fps) were used. The conducted experiments comprises testing the videos with different bit rates and detecting the hidden watermark, measuring the bit correct ratio or BCR. The parameters used for Lin et al.'s method were α=150 and β=10, i.e., 15 bits were hidden and the size of the queue was 10 entries.

Figure 6:
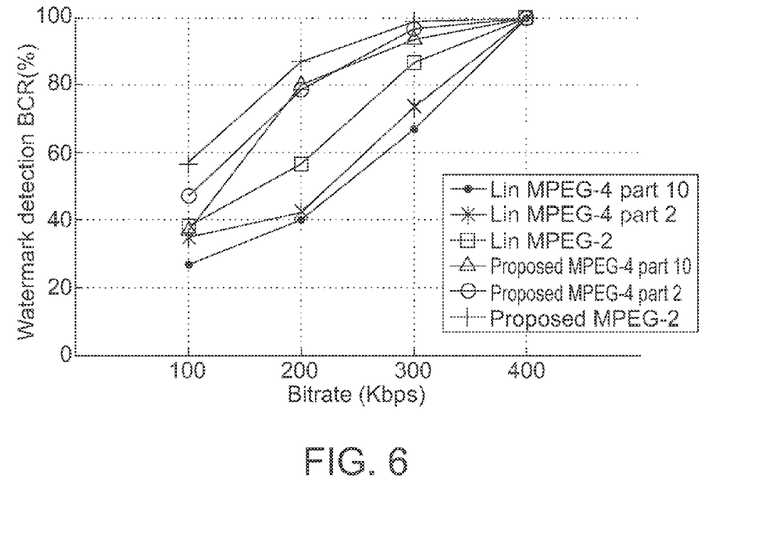
FIG. 6 is a chart of the performance of the present invention method against MPEG-2, MPEG-4 part 2 and MPEG-4 part 10 compression.

FIG. 6 shows the performance of both methods: prior art (Lin et al.) method and the present invention against compression attacks. The performance of the present invention overcomes the prior art method in all aspects except for the case of encrypted video al 400 Kbps bit rate where both performed similarly. Both methods are affected by MPEG-4 part 10 compression, since this achieves a better reduction of temporal and spatial redundancy mechanism (bit rate control).

However, the detection of the watermark using the present invention is up to 40% better than the method of the prior art against the MPEG-4 part 10 compression at 200 Kbps. The bit rate influences the impact of temporal and spatial attacks during compression. The higher the bit rate, the less aggressive the spatial and temporal attacks, and the lower the bit rate, the less severe the spatial and temporal attacks. The bit rate also affects the watermark detection as shown in FIG. 6, where the detection percentage improves as the bit rate increases.

The method of the present invention and the prior art's method utilize a basic spread spectrum technique to embed the watermark as indicated by equation II:

$$y_i = x_i + sw_i \quad \text{II)}$$

where $y_i$ is the watermarked i frame, $x_i$ is the original i frame, s is a robustness factor and $w_i$ is a watermark. The watermark is a random variable with normal distribution N(0,1). Detection is performed by using a low pass filter to reduce the effect of the original image, as suggested by Kalker et al in SPIE Security and Watermarking of Multimedia Content: "A Video Watermarking System For Broadcast Monitoring", followed by correlation with the watermark signal. The correlation is carried out as shown in equation III:

$$c = E\{y \cdot w\} \quad \text{III)}$$

if c≈0, the watermark does exist
else c≈0, the watermark does not exist

The present invention is directed to state transformation method of key sequence for video watermarking robust to MPEG-2, MPEG-4 part 2 and MPEG-4 part 10. The present method comprises redundancy mechanism in embedding process which increases the resistance to the main widely used video compression methods. The experimental results indicate that the method of the present invention has unexpectedly better resistance to MPEG compression as compared to method known in the art.

In relation to an analysis of the influence of the watermark embedding in the bit rate control mechanism, as well as, embedding multiple watermarks in a frame to increase the capacity method, the algorithm of the present invention provides increased robustness against other types of attacks. Testing shows improved response to frame dropping, frame transposition, frame decimating, and frame averaging. A summary table is shown in FIG. 7 which compares BCR performance of the improved method against the prior art method using various types of attacks.

While the invention has been illustrated and described as embodied in the temporal synchronization in video marking method, it is not intended to be limited to the details shown, since it is well understood that various omissions, modifications, substitutions and changes in the forms and details of the method illustrated and in its operation can be made by those skilled in the art without departing in any way from the spirit of the present invention.

The invention claimed is:

1. A video watermarking method resistant to temporal desynchronization attacks, of the type that comprises a watermark embedding stage where the watermark is constructed and then embedded into an original signal to produce a watermarked signal using a finite state machine; an attack stage where the watermarked signal is subjected of different types of attacks; a watermark detection stage where a watermark extractor using a finite state machine examines and reports the watermarked signal and the initial synchronization is achieved by finding an initial synchronization key though analysis of the temporal media signal stream; characterized in that during the watermarking embedding stage, the same watermark is hidden in a number of frames given by the mutual information between them; a temporal redundancy control is modified to hide a watermark in each possible I-frame; and, during the watermark detection stage, the watermark extractor takes all the frames watermarked with the same key to extract its characteristics.

2. A video watermarking method resistant to temporal desynchronization attacks according to claim 1, further characterized in that for hiding the same watermark in a number of frames given, the metric of mutual information is given by equation I:

$$I(X, Y) = \sum_{x \in X} \sum_{y \in Y} p(x, y) \log\left(\frac{p(x, y)}{p(x)p(y)}\right) \qquad \text{I})$$

where p(x, y) is the joint probability mass function or pmf of the random variables X and Y (i. e., frame X and frame Y), p(x) and p(y) represents the marginal pmf of X and Y, respectively.

3. A video watermarking method resistant to temporal desynchronization attacks according to claim 1, further characterized in that for determining an amount of frames watermarked with the same key a threshold U is used.

4. A video watermarking method resistant to temporal desynchronization attacks according to claim 3, further characterized in that the value of the threshold U is at least 1.

5. A video watermarking method resistant to temporal desynchronization attacks according to claim 3, further characterized in that the amount of consecutive frames to be watermarked is established up to 20.

6. A video watermarking method resistant to temporal desynchronization attacks according to claim 1, further characterized in that an image that represents all the frames with "β" repetition is obtained by averaging the low frequencies of the watermarked frames using a Gaussian filter.

7. A video watermarking method resistant to temporal desynchronization attacks according to claim 6, further characterized in that the Gaussian filter used has a "σ" from 2 to 7.

8. A video watermarking method resistant to temporal desynchronization attacks according to claim 7, further characterized in that the Gaussian filter used has a "σ" of 4.

9. A video watermarking method resistant to temporal desynchronization attacks according to claim 6, further characterized by a new X, Y and Z characteristic no longer close to a previous frame, which are obtained adding the magnitudes of the feature points, using a Harris Detector, to an initial X, Y and Z characteristics.

10. A video watermarking method resistant to temporal desynchronization attacks according to claim 1, further characterized in that it provides MPEG compression which encodes some frames internally as if they were images (I-frame), in order to hide the watermark on each possible frame to avoid the aggressive attack of motion estimation.

11. A video watermarking method resistant to temporal desynchronization attacks according to claim 10, further characterized in that the MPEG compression which encodes some frames internally uses motion estimation taking I-frames as basis (P-frame), in order to hide the watermark on each possible frame to avoid the aggressive attack of motion estimation.

12. A video watermarking method resistant to temporal desynchronization attacks according to claim 10, further characterized in that the MPEG compression which encodes some frames internally uses motion estimation taking P-frames as basis (B-frame) in order to hide the watermark on each possible frame to avoid the aggressive attack of motion estimation.

13. A video watermarking method resistant to temporal desynchronization attacks according to claim 10, further characterized in that I-frames are created in the watermark embedding stage when a shift of scene is detected and the end of each scene is obtained using the metric of mutual information from equation I.

14. A video watermarking method resistant to temporal desynchronization attacks according to claim 1, further characterized in that a redundancy period a depends on the amount of information to be embedded and on the size of β, which is adaptable.

15. A video watermarking method resistant to temporal desynchronization attacks according to claim 14, further characterized in that two values of period redundancy (α) are used, one for embedding the information in a sequential way and the other for embedding the information at the beginning of each scene.

* * * * *